United States Patent
Yamaguchi

(10) Patent No.: US 6,869,723 B2
(45) Date of Patent: *Mar. 22, 2005

(54) NONAQUEOUS-ELECTROLYTE SECONDARY BATTERY

(75) Inventor: Akira Yamaguchi, Fukushima (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 450 days.

(21) Appl. No.: 09/262,325

(22) Filed: Mar. 4, 1999

(65) Prior Publication Data

US 2002/0004161 A1 Jan. 10, 2002

(30) Foreign Application Priority Data

Mar. 10, 1998 (JP) .......................................... P10-057968

(51) Int. Cl.$^7$ ............................ H01M 4/70; H01M 4/48
(52) U.S. Cl. ...................... 429/94; 429/212; 429/231.1; 429/233
(58) Field of Search .......................... 429/94, 164, 212, 429/233, 231.1

(56) References Cited

U.S. PATENT DOCUMENTS

| | | | |
|---|---|---|---|
| 4,664,989 A | * 5/1987 | Johnson | 429/94 |
| 5,106,707 A | * 4/1992 | Catotti et al. | 429/94 |
| 5,360,684 A | 11/1994 | Duval et al. | |
| 5,508,122 A | 4/1996 | Narukawa et al. | |
| 5,925,482 A | * 7/1999 | Yamashita | 429/130 |
| 5,989,743 A | * 11/1999 | Yamashita | 429/129 |
| 6,051,333 A | * 4/2000 | Nagai et al. | 429/94 |

FOREIGN PATENT DOCUMENTS

| | | |
|---|---|---|
| EP | 0 780 920 A1 | 6/1997 |
| JP | 62272471 | 11/1987 |
| JP | 05234620 | 9/1993 |

OTHER PUBLICATIONS

Linden. Handbook of Batteries, 2nd ed., pp. 3.16,5.3,14.20, 14.35,14.84,33.4,36.29,36.43–44. 1995 (no month).*
Linden, David. Handbook of Batteries, 2nd ed., pps. 36.4–36.9, 1995.*

* cited by examiner

Primary Examiner—Tracy Dove
(74) Attorney, Agent, or Firm—Sonnenschein, Nath & Rosenthal LLP

(57) ABSTRACT

A nonaqueous-electrolyte secondary battery including a coil electrode formed by laminating an elongated positive electrode having a positive-electrode-mix layer formed on at least one surface of a positive-electrode collector and an elongated negative electrode having a negative-electrode-mix layer formed on at least one surface of a negative-electrode collector and by winding a laminate such that the positive electrode is positioned at the outermost position, wherein the positive-electrode-mix layer is formed on only one surface of the collector at the position adjacent to the outermost end of the positive electrode and/or the position adjacent to the innermost end of the positive electrode. The positive-electrode-mix layer is not formed on the positive-electrode collector at the outermost end of the positive electrode. The negative-electrode-mix layer is not formed on the negative-electrode collector at the outermost end of the negative electrode and the outermost end of the negative-electrode collector positioned at the outermost end of the negative electrode is, in the direction from the inner portion of the coil electrode toward the outer portion, positioned more forwards than the outermost end of the positive-electrode collector.

11 Claims, 5 Drawing Sheets

NONAQUEOUS-ELECTROLYTE SECONDARY BATTERY

RELATED APPLICATION DATA

The present application claims priority to Japanese Application No. P10-057968 filed Mar. 10, 1998 which application is incorporated herein by reference to the extent permitted by law.

BACKGROUND OF THE INVENTION

1. Field of the Invention

The present invention relates to a nonaqueous-electrolyte secondary battery incorporating a coil electrode formed by laminating elongated positive and negative electrodes through separators such that the outermost layer is the positive electrode.

2. Related Background Art

Secondary batteries for electronic apparatuses have been nickel-cadmium batteries or lead batteries. In recent years, the performance of the electronic apparatus has improved, the size has been reduced, and a portable structure has been developed. However, researchers continue to investigate secondary batteries with increased energy densities. There arises a problem in that the energy density of the nickel-cadmium battery and that of the lead battery cannot satisfactorily be raised because of low discharge voltages.

In recent years, a nonaqueous-electrolyte secondary battery has been developed and researched as a secondary battery expected to be capable of raising the discharge voltage and realizing small self-discharge and a long lifetime. The nonaqueous-electrolyte secondary battery has been employed in place of the nickel-cadmium battery and the lead battery. The nonaqueous-electrolyte secondary battery incorporates a negative electrode made of a material, such as a carbon material, which permits doping/dedoping of lithium ions; and a positive electrode made of a composite lithium oxide, such as composite lithium-cobalt oxide.

As described above, the nonaqueous-electrolyte secondary battery should to have a small self-discharge characteristic under a heavy load and a long lifetime. Therefore, the electrodes of the above-mentioned nonaqueous-electrolyte secondary battery have usually been formed into a coil electrode structure as shown in FIG. 1. As shown in FIG. 1, an elongated positive electrode 103 incorporates positive-electrode mix layers 102a and 102b formed by applying a positive-electrode mix to each of the two sides of a collector 101. An elongated negative electrode 106 similarly incorporates negative-electrode-mix layers 105a and 105b formed by applying a negative-electrode mix to each of the two sides of a collector 104. The positive and negative electrodes 103 and 106 are wound such that a separator 107 is interposed between the electrodes so that a coil electrode 108 is formed. In the foregoing case, an internal short circuit occurring when lithium is deposited during a charging operation must be prevented. Therefore, the width and length of the negative electrode 106 opposite to the positive electrode 103 usually are made to be longer than those of the positive electrode 103.

The above-mentioned coil electrode 108 is made so that the negative electrode 106 forms the innermost layer and the outermost layer above coil. The negative-electrode contains non-reacted active material which does not undergo charge/discharge at the end of the outermost layer of the negative electrode 106 and the innermost layer of the negative electrode. Therefore, the inside portion of the battery cannot effectively be used. As a result, the energy density of the battery is unsatisfactorily low.

To solve the above-mentioned problems, a technique has been disclosed in Japanese Patent Laid-Open No. 5-234620. As shown in FIG. 2, an elongated positive electrode 113 incorporates positive-electrode-mix layers 112a and 112b formed by applying a positive-electrode mix to each of the two sides of a collector 111. An elongated negative electrode 116 incorporates negative-electrode-mix layers 115a and 115b formed by applying a negative-electrode-mix to each of the two sides of a collector 114. The positive electrode 113 and the negative electrode 116 are wound such that a separator 117 is interposed so that a coil electrode 118 is formed. The outermost electrode, where charge/discharge of the coil electrode 118 is performed, is the positive electrode 113. Moreover, a portion of the positive electrode adjacent to the outermost end 113a of the positive electrode and/or a portion of the positive electrode adjacent to the innermost end 113b of the positive electrode is formed such that the positive-electrode-mix layer 112a is formed on one of the two main surfaces of the collector 111. Thus, the quantity of the non-reacted negative-electrode active material in the battery is reduced. The inside portion of the battery is more effectively used, thereby raising the energy density of the battery.

The above-mentioned coil electrode has the structure as shown in FIG. 2 such that the outermost end 116a of the negative electrode 116 is formed of only the collector 114. A negative-electrode lead 119 forms a projection on the upper surface of the collector 114. The positive electrode 113 has an outermost end 113a formed of only the collector 111. The negative electrode lead projection may pierce the separator 117 disposed between the negative electrode 116 and the positive electrode 113. The projection is undesirably brought into contact with the collector 111 of the positive electrode 113. A short circuit then takes place. As a result, with this structure, the percentage of defective batteries is undesirably increased and the reliability of the battery deteriorates.

SUMMARY OF THE INVENTION

In view of the foregoing, an object of the present invention is to provide a nonaqueous-electrolyte secondary battery which reduces the quantity of a non-reacted active material for the negative electrode in the battery to more effectively use the inside portion of the battery so as to raise the energy density and elongate the battery's lifetime.

According to one aspect of the present invention, there is provided a nonaqueous-electrolyte secondary battery having a coil electrode formed by laminating an elongated positive electrode which has a positive-electrode-mix layer formed on the first and second surfaces of a positive-electrode collector and an elongated negative electrode which has a negative-electrode-mix layer formed on the first and second surfaces of a negative-electrode collector. The laminate is wound such that the positive electrode is positioned at the outermost position of the coil electrode. The positive-electrode-mix layer is formed on either the first or second surface of the collector at the position adjacent to the outermost end of the positive electrode and/or the position adjacent to the innermost end of the positive electrode. The positive-electrode-mix layer is not formed on either surface of the positive-electrode collector at the outermost end of the positive electrode so that there is no positive-electrode mix layer opposite to a negative-electrode mix layer in this region; only the positive-electrode collector is formed. The negative-electrode-mix layer is not formed on either surface of the negative-electrode collector at the outermost end of the negative electrode; only the negative-electrode collector is formed in this region. The outermost end of the negative-electrode collector positioned at the outermost end of the negative electrode is, in the direction from the inner portion of the coil electrode toward the outer portion of the coil electrode, positioned more forward than the outermost end of the positive-electrode collector of the coil electrode.

The nonaqueous-electrolyte secondary battery according to the present invention may have a coil electrode that incorporates a negative-electrode lead adjacent to an outermost end of the negative-electrode collector positioned at the outermost end of the negative electrode. The negative-electrode lead is positioned more forward than the outermost end of the positive-electrode collector positioned at the outermost end of the positive electrode.

The nonaqueous-electrolyte secondary battery according to the present invention may be structured so that (1) if the coil electrode has a diameter d, and (2) if the distance from the outermost end of the negative-electrode collector positioned at the outermost end of the negative electrode to the outermost end of the positive-electrode collector positioned at the outermost end of the positive electrode is L, then the following relationship is satisfied:

$$0 < L \leq \pi d$$

The nonaqueous-electrolyte secondary battery according to the present invention has a negative electrode with a negative-electrode mix containing a negative-electrode material and a binder. The negative-electrode material is at least one type material selected from a group consisting of a crystalline metal oxide and an amorphous metal oxide which permits doping/dedoping of lithium ions.

The nonaqueous-electrolyte secondary battery according to the present invention has a positive electrode with a positive-electrode mix containing a positive-electrode material, a conductive material, and a binder. The positive-electrode material is at least one type material selected from a group consisting of $LiMO_2$ (where M is at least any one of Co, Ni, Mn, Fe, Al, V and Ti) and interlayer compounds each containing Li.

The nonaqueous-electrolyte secondary battery according to the present invention has a separator made of at least one type material selected from a group consisting of polyethylene and polypropylene.

The nonaqueous-electrolyte secondary battery according to the present invention has a positive-electrode collector is made of at least one type material selected from a group consisting of aluminum, stainless steel and nickel. The negative-electrode collector is made of at least one type material selected from a group consisting of copper, stainless steel and nickel.

The nonaqueous-electrolyte secondary battery according to the present invention has a nonaqueous electrolyte prepared by dissolving an electrolyte in nonaqueous solvent. The nonaqueous solvent is made of at least one type material selected from a group consisting of propylene carbonate, ethylene carbonate, 1,2-dimethoxyethane, 1,2-diethoxyethane, diethylcarbonate, γ-butyrolactone, tetrahydrofuran, 1,3-dioxolane, 4-methyl-1,3-dioxolane, diethylether, sulfolane, methylsulfolane, acetonitrile and propionitrile. The electrolyte is at least one type material selected from a group consisting of $LiClO_4$, $LiAsF_6$. $LiPF_6$, $LiBF_4$, $LiB(C_6H_5)_4$, LiCl, LiBr, $LiSO_3CH_3$ and $LiSO_3CF_3$.

Other objects, features and advantages of the invention will be evident from the following detailed description of the preferred embodiments described in conjunction with the attached drawings.

DESCRIPTION OF THE PREFERRED EMBODIMENTS

An embodiment of the present invention will now be described with reference to the drawings.

Figure 1:
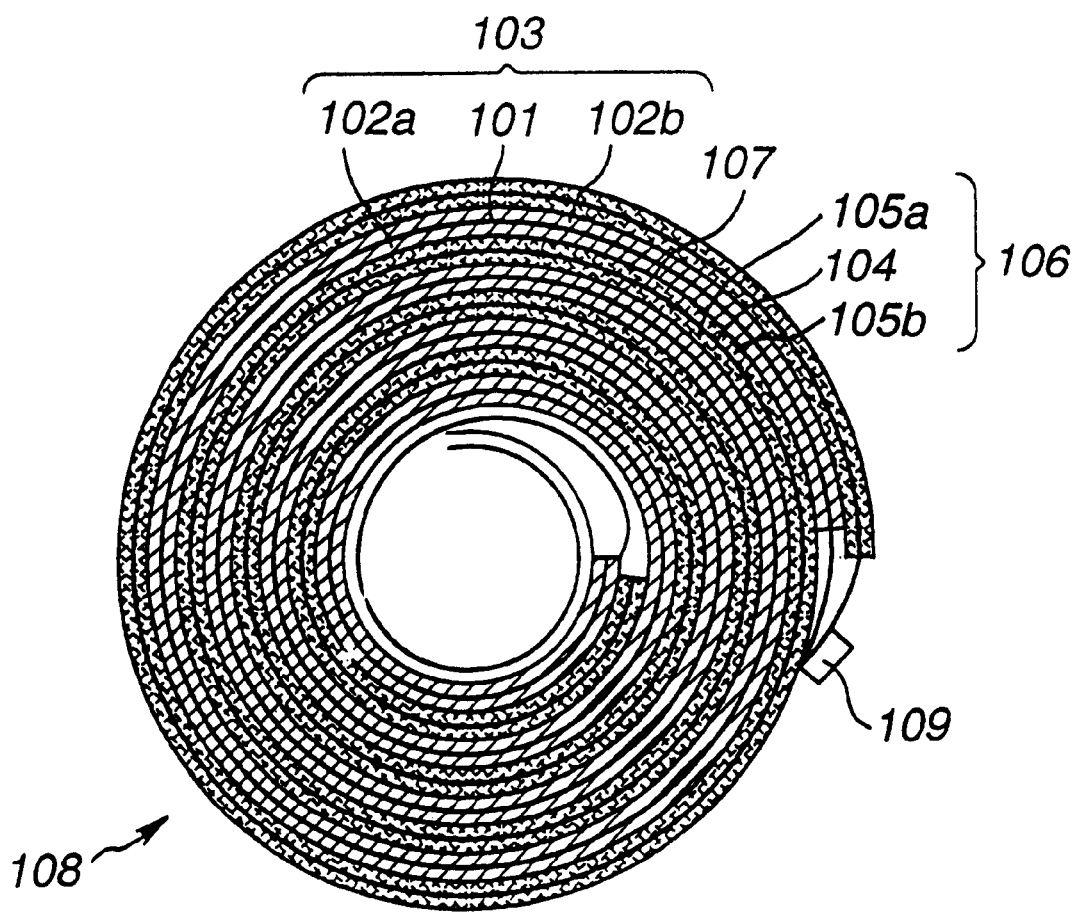
FIG. 1 is a cross sectional view showing the structure of a conventional nonaqueous-electrolyte secondary battery.
Figure 2:
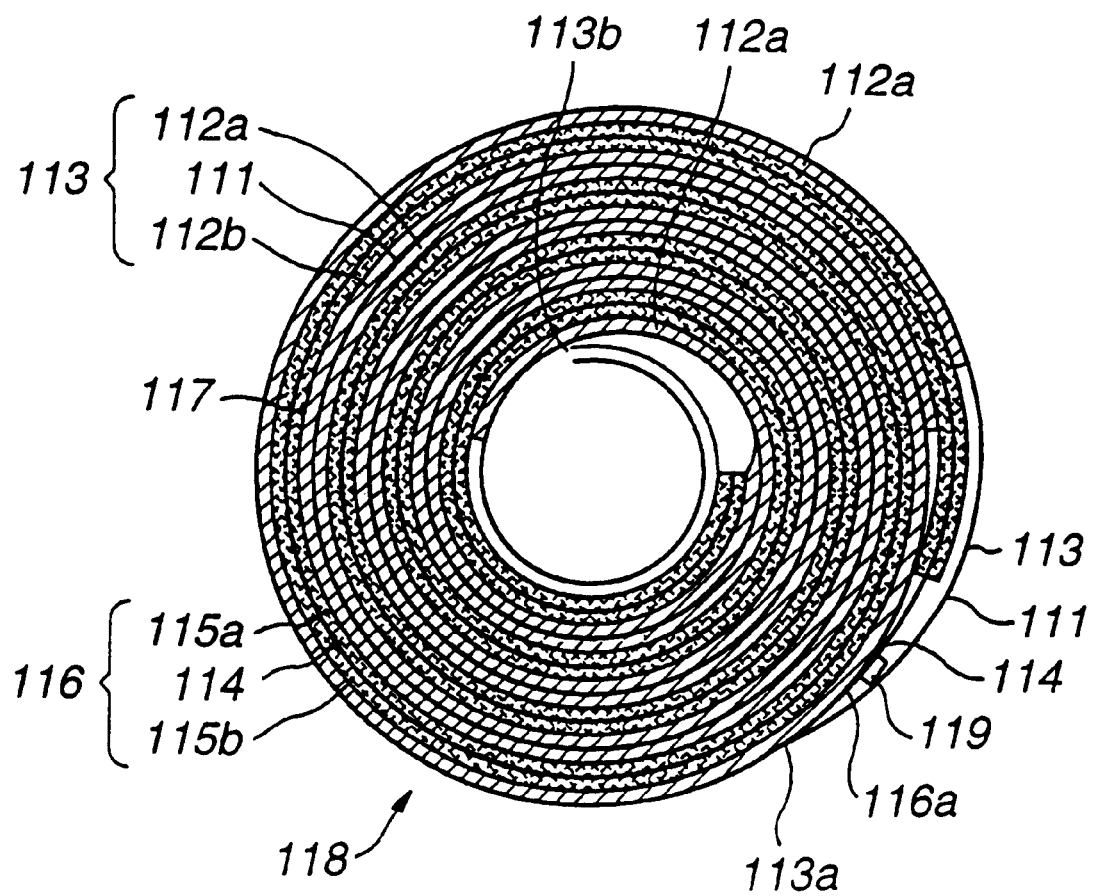
FIG. 2 is a cross-sectional view showing another conventional nonaqueous-electrolyte secondary battery.
Figure 3:
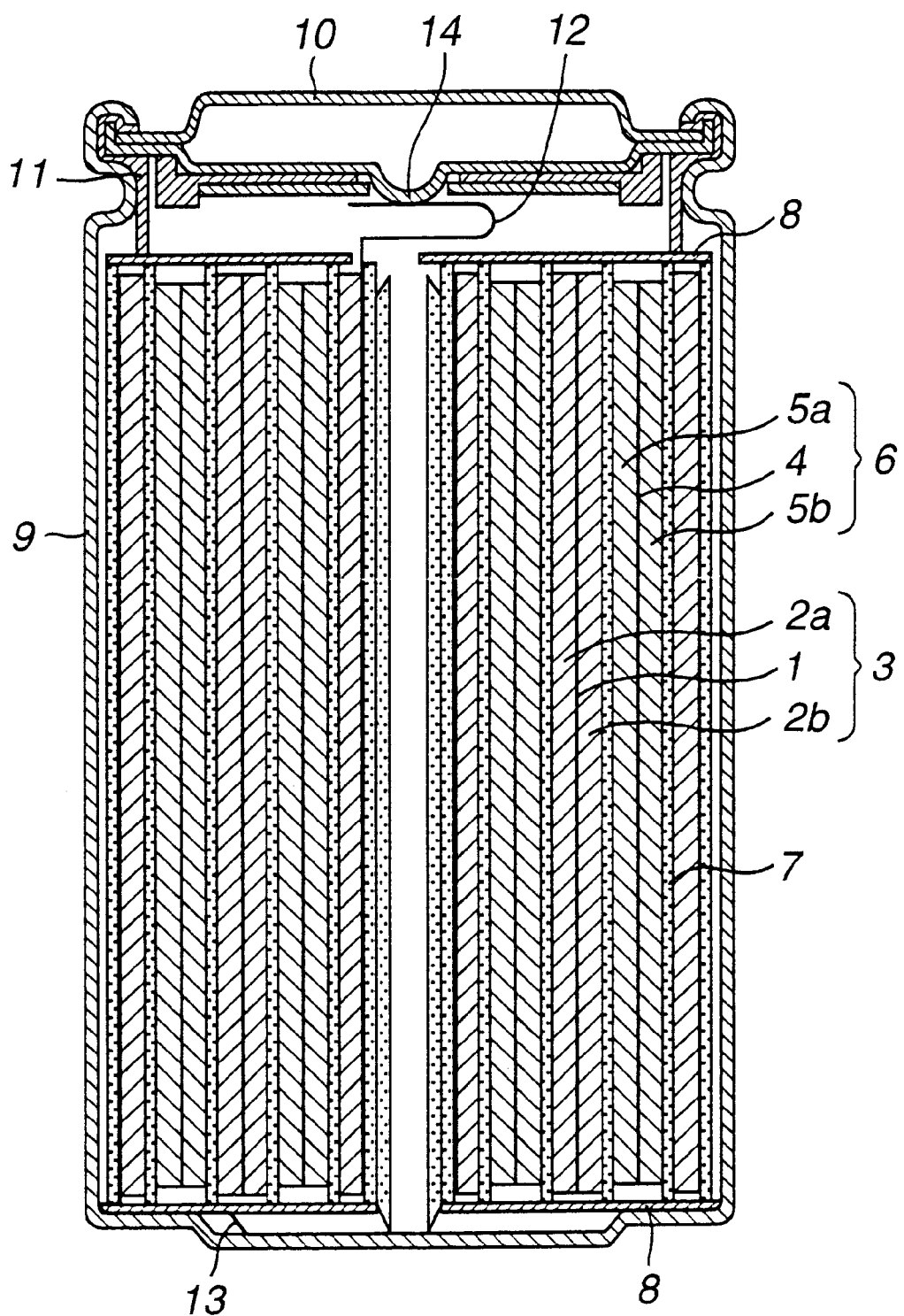
FIG. 3 is a cross-sectional view showing the structure of a nonaqueous-electrolyte secondary battery according to the present invention.

An embodiment of a nonaqueous-electrolyte secondary battery according to the present invention is shown in FIG. 3.

The nonaqueous-electrolyte secondary battery according to this embodiment, as shown in FIG. 3, incorporates a positive electrode 3 having positive-electrode-mix layers 2a and 2b formed on the two sides of a positive-electrode collector 1. A negative electrode 6 incorporates negative-electrode-mix layers 5a and 5b formed on the two sides of the negative-electrode collector 4. The positive electrode 3 and the negative electrode 6 are wound with a separator 7 is interposed between them to form a coil electrode. The separator 7 is a small-pore film made of polypropylene or polyethylene. Insulating members 8 are placed on the two vertical surfaces of the coil electrode. The coil electrode having the insulating members 8 are placed into a battery can 9.

A battery cover 10 is joined to the battery can 9 by crimping the battery cover 10 through a sealing gasket 11. The battery cover 10 and the battery can 9 are electrically connected to the positive electrode 3 and the negative electrode 6 respectively through a positive-electrode lead 12 and a negative-electrode lead 13. Thus, the positive electrode and the negative electrode of the battery are formed.

A current-limiting thin plate 14 serves as a safety unit for the battery according to this embodiment. The positive-electrode lead 12 is welded to the current-limiting thin plate 14 so as to be electrically connected to the battery cover 10 through the current-limiting thin plate 14.

When the pressure in the battery having the above-mentioned structure has been raised, the current-limiting thin plate 14 is pushed upward and is therefore deformed. Thus, the positive-electrode lead 12 is cut such that a portion welded to the current-limiting thin plate 14 is left. As a result, the electric current is limited.

Figure 4:
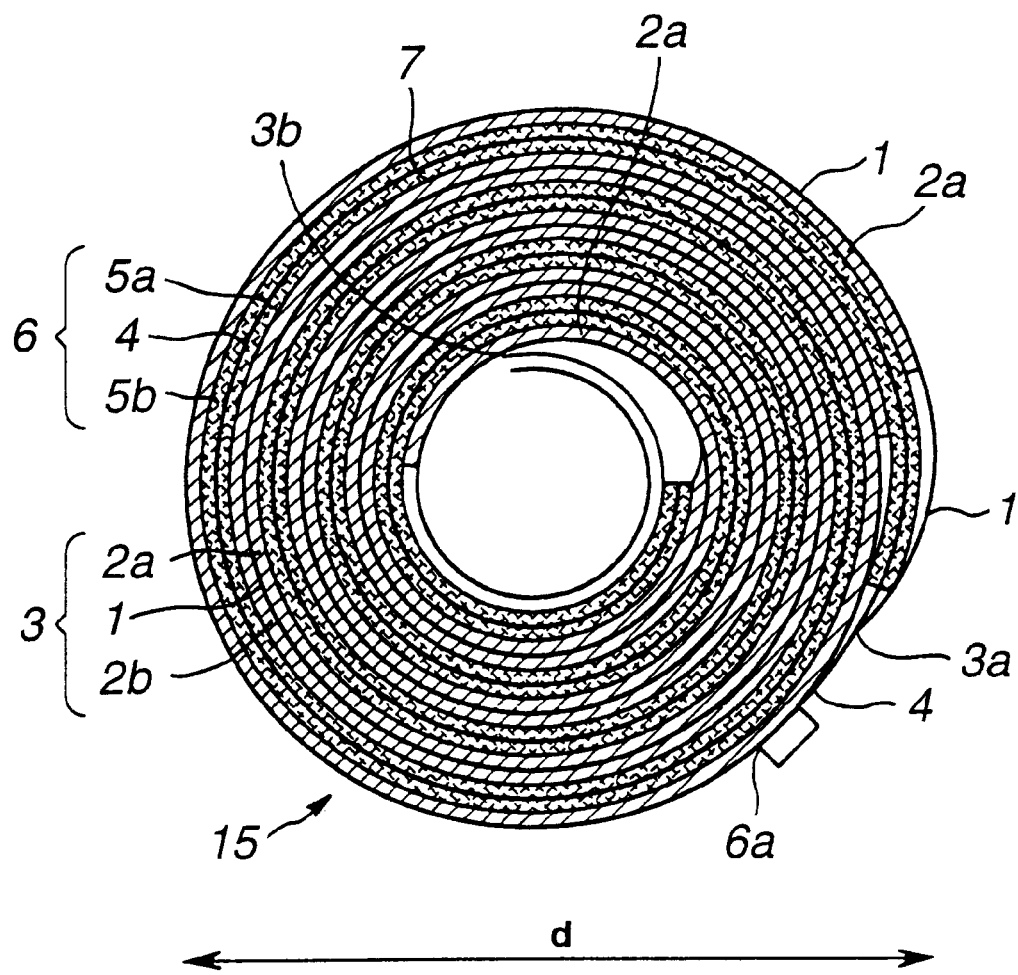
FIG. 4 is a cross sectional view showing the structure of the nonaqueous-electrolyle secondary battery according to the present invention.

A cross-sectional structure of the nonaqueous-electrolyte secondary battery according to the present invention is shown in FIG. 4. In the nonaqueous-electrolyte secondary battery according to this embodiment, the positive-electrode-mix layer 2a is formed on either the first or second surface of the positive-electrode collector 1 at a position adjacent to the outermost end 3a of the positive electrode 3 and/or at the innermost end 3b of the positive electrode in the coil electrode. No positive-electrode-mix layer 2b is formed on the positive-electrode collector 1 at the outermost end 3a of the positive electrode 3. Moreover, no negative-electrode-mix layer is formed on the negative-electrode collector 4 at the outermost end 6a of the negative electrode 6. That is, only the negative-electrode collector 4 is formed at the outermost end 6a.

In a direction from the inner portion of the coil electrode 15 to the outer portion of the electrode, the outermost end of the negative-electrode collector 4 (which is the outermost end 6a of the negative electrode 6) is positioned more forward than the outermost end of the positive-electrode collector 1 (which is the outermost end 3a of the positive electrode 3).

Figure 5:
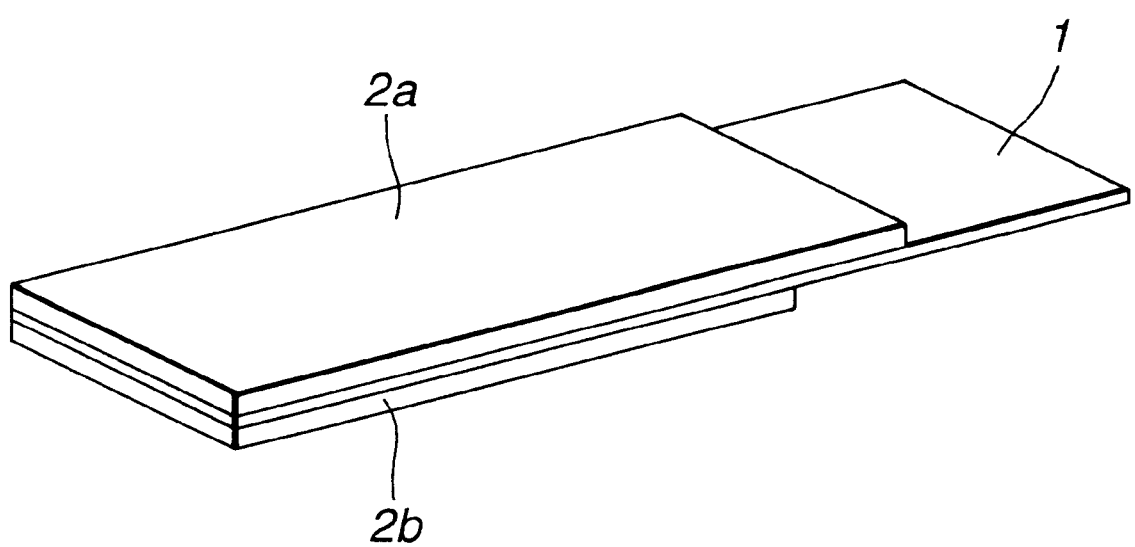
FIG. 5 is a perspective view showing a portion including a positive-electrode collector of the nonaqueous-electrolyte secondary battery according to the present invention.

As described above, the positive-electrode-mix layer 2a is formed on either the first or second surface of the positive-electrode collector 1 at the position adjacent to the outermost end 3a of the positive electrode 3 and/or the position adjacent to the innermost end 3b of the positive electrode. This is shown in FIG. 5.

In the nonaqueous-electrolyte secondary battery according to the present invention, the negative-electrode lead 13 is formed adjacent to the outermost end of the negative-electrode collector 4 (which is the outermost end 6a of the negative electrode 6 of the coil electrode 15). In a direction from the inner portion of the coil electrode 15 to the outer portion, the negative-electrode lead 13 is positioned more forward than the outermost end of the positive-electrode collector 1 (which is the outermost end 3a of the positive electrode 3). Note that the nonaqueous-electrolyte secondary battery according to the present invention has a positive electrode lead (not shown) on the positive electrode 3 disposed in the inside portion of the coil electrode.

In the direction from the inner portion of the coil electrode 15 toward the outer portion of the coil, the distance from the outermost end of the negative-electrode collector 4 (which is the outermost end 6a of the negative electrode 6) to the outermost end of the positive-electrode collector 1 (which is the outermost end 3a of the positive electrode 3) is defined as L. The diameter of the coil electrode 15 is defined as d. It is preferable that the relationship $0 < L \leq \pi d$ is satisfied.

The nonaqueous-electrolyte secondary battery according to the present invention incorporates the coil electrode 15. The coil electrode 15 is formed by laminating the elongated positive electrode 3 and the elongated negative electrode 6 with a separator 7 placed there between. The positive electrode, negative electrode are wound so that the outermost layer is the positive electrode 3. The positive-electrode-mix layer 2a is formed on either the first or second surface of the positive-electrode collector 1 at the position adjacent to the outermost end 3a of the positive electrode 3 and/or the position adjacent to the innermost end 3b. In addition, no positive-electrode mix is formed on the positive-electrode collector 1 at the outermost end 3a of the positive electrode 3. Only the positive-electrode collector 1 is formed at the outermost end 3a. Moreover, no negative-electrode-mix layer is formed on the negative-electrode collector 4 at the outermost end 6a of the negative electrode 6. Only the negative-electrode collector 4 is formed at the outermost end 6a.

In the direction from the inner portion of the coil electrode 15 toward the outer portion, the outermost end of the negative-electrode collector 4 (which is the outermost end 6a of the negative electrode 6) is positioned more forward than the outermost end of the positive-electrode collector 1 (which is the outermost end 3a of the positive electrode 3). Therefore, the quantity of a non-reacted negative-electrode active material in the battery can be reduced. As a result, an effective area can be enlarged in the battery. Thus, the inside portion of the battery can be more effectively used, causing the energy density to be raised and charge/discharge capacity elongated.

The nonaqueous-electrolyte secondary battery according to the present invention incorporates the negative-electrode lead 13 formed adjacent to the outermost end of the negative-electrode collector 4 (which is the outermost end 6a of the negative electrode 6). In the direction from the inner portion of the coil electrode 15 toward the outer portion of the same, the negative-electrode lead 13 is positioned more forward than the outermost end of the positive-electrode collector 1 (which is the outermost end 3a of the positive electrode 3). Therefore, even if the negative-electrode lead 13 pierces the separator 7 disposed between the coil electrode 15 and the battery can 9, the negative-electrode lead 13 is brought into contact with only the battery can 9 which is also the negative electrode. As a result, an internal short circuit does not occur and no defect takes place. The reliability of the battery is significantly improved.

In the coil electrode 15 of the nonaqueous-electrolyte secondary battery according to the present invention, the outermost end of the negative-electrode collector 4 (which is the outermost end 6a of the negative electrode 6) is positioned more forward than the outermost end of the positive-electrode collector 1 (which is the outermost end 3a of the positive electrode 3). If the distance from the outermost end of the negative-electrode collector 4 to the outermost end of the positive-electrode collector 1 is L, and the diameter of the coil electrode 15 is d, it is preferable that the relationship $0 < L \leq \pi d$ is satisfied. If the foregoing structure is employed, no internal short circuit occurs. This results in increased energy density and elongated lifetime of the battery.

A state will now be considered that the distance L is shorter than the above-mentioned range. In the foregoing case, the outermost end of the positive-electrode collector 1 overlaps the outermost end of the negative-electrode collector 4. As shown below, the percentage of defective batteries is raised. In addition, if the distance L is longer than the above-mentioned range, the negative electrode 6 and the positive electrode 3 are not opposite to each other in a substantial portion of the coil. Therefore, the energy density is undesirably lowered.

The positive electrode 3 and the negative electrode 6 according to the present invention have the above-mentioned structure. The mix layers and collectors for making the positive electrode 3 and the negative electrode 6 are materials well known in the art. The positive-electrode-mix layers 2a and 2b contain a positive-electrode material, which permits lithium ions to be doped/dedoped, a conductive material and a binder. It is preferable that the positive-electrode material contains Li in a sufficiently large quantity. For example, it is preferable that to employ a composite metal oxide expressed by $LiMO_2$, (where M is at least one type of a material selected from a group consisting of Co, Ni, Mn, Fe, Al, V and Ti) and composed of Li and a transition metal; or an interlayer compound containing Li. The conductive material for imparting conductivity to the positive electrode and the binder for causing the positive-electrode material to be held by the positive-electrode collector are materials well known in the art. The conductive material may be graphite or carbon black, while the binder may be fluorine resin, such as polyvinylidene fluoride.

The negative-electrode-mix layers 5a and 5b contain the negative-electrode material which permits lithium ions to be doped/dedoped and a binder. The negative-electrode material may be a carbon material. The carbon material is exemplified by pyrocarbon, coke (pitch coke, needle coke and petroleum coke), graphite, vitreous carbon, a calcinated organic polymer compound (a material obtained by calcinating phenol resin, furan resin or the like), carbon fiber and active carbon. The negative-electrode material may be crystalline metal oxide or amorphous metal oxide which permits lithium ions to be doped/dedoped, as well as the foregoing carbon material. The binder for causing the negative-electrode material to be held by the negative-electrode collector may be a known material. For example, the binder may be fluorine resin, such as polyvinylidene fluoride.

The battery according to the present invention contains a known nonaqueous electrolyte in which an electrolyte is dissolved in nonaqueous solvent, such as organic solvent. The organic solvent is not limited particularly. The organic solvent is exemplified by propylene carbonate, ethylene carbonate, 1,2-dimethoxyethane 1,2-dimethoxyethane, 1,2-diethoxyethane, diethyl carbonate, γ-butyrolactonel, tetrahydrofuran, 1,3-dioxolane, 4-methyl-1,3-dioxolane, diethylether, sulfolane, methylsulfolane, acetonitrile and propionitrile. Any one of the foregoing materials may be employed or a mixture of the same may be employed as mixed solvent. The electrolyte is not limited particularly. The electrolyte is exemplified by $LiClO_4$, $LiAsF_6$, $LiPF_6$, $LiBF_4$, $LiB(C_6H_5)_4$, LiCl, LiBr, $LiSO_3CH_3$ and $LiSO_3CF_3$.

The material of the separator 7 is not limited particularly. The material is exemplified by woven fabric, unwoven fabric or small-pore film made of synthetic resin. In particular, the small-pore film made of synthetic resin is a preferred material. Moreover, a polyolefine small-pore film is a preferred material in view the required thickness, strength and resistance of the film. Specifically, the following materials may be employed: a small-pore film made of polyethylene or polypropylene or a small-pore film made of a mixture of the foregoing materials.

The shape of the collector of the electrode is not limited particularly. A foil structure, a mesh structure, or a net structure made of expanded metal may be employed. It is preferable that the positive-electrode collector 1 is made of, for example, aluminum, stainless steel or nickel. It is preferable that the negative electrode collector 4 is made of, for example, copper, stainless steel or nickel.

The battery can 9 may be made of iron, nickel, stainless steel or aluminum. If electrochemical corrosion occurs in the nonaqueous electrolyte containing the above-mentioned material during the operation of the battery, plating may be performed.

EXAMPLES

Examples of the present invention will now be described with results of experiments.
Manufacturing of Samples
Sample 1
To manufacture, the negative electrode, petroleum pitch was employed as a starting material. The petroleum pitch was calcinated so that coarse pitch coke was obtained. The coarse pitch coke was pulverized so that powder having an average particle size of 40 μm was obtained. Then, the obtained powder was calcinated in an inactive gas at 1000° C. to remove impurities. Thus, a coke powder was obtained.

Then, 90 parts by weight of thus-obtained coke powder, serving as a carrier for negative-electrode active material, and 10 parts by weight of polyvinylidene fluoride ("PVDF") serving as a binder were mixed. This negative-electrode mix was dispersed in N-methylpyrolidone, which serves as solvent. A negative-electrode mix slurry was obtained. The negative-electrode mix slurry was applied to the two sides of a negative-electrode collector in the form of copper foil having a thickness of 10 μm. Then, the applied solvent was dried. The negative-electrode collector was compression-molded with a roller pressing machine. An elongated negative electrode was obtained which had a width of 41.5 mm and a length of 250 mm. The thickness of the negative-electrode-mix layer on each side of the negative-electrode collector was 105 μm. The negative-electrode-mix layer was not formed on the negative-electrode collector of the negative electrode at the outermost end. The outermost end contained only the negative-electrode collector.

To manufacture the positive electrode, about 0.05 mole of lithium carbonate and 1 mole of cobalt carbonate were mixed with each other, and then the mix was calcinated at 900° C. in air for 5 hours to obtain $LiCoO_2$. The $LiCoO_2$ was used as a positive-electrode active material such that 91 parts by weight of $LiCoO_2$, 6 parts by weight of graphite serving as a conductive material and 3 parts by weight of PVDF serving as a binder were mixed with each other. The positive-electrode mix was dispersed in N-methylpyrolidone so that a positive-electrode mix slurry was obtained. The positive-electrode mix slurry was applied to a positive-electrode collector made of elongated aluminum foil having a thickness of 20 μm. On one surface of the collector, the slurry was applied to a region having a length of 247 mm. Then, the positive-electrode mix slurry was dried. The positive-electrode mix slurry was then applied to the other main surface of the positive-electrode collector in a region having a length of 167 mm such that a position at which the application was started was made coincide with the above-mentioned positive-electrode mix slurry. Then, the positive-electrode mix slurry was dried, followed by compressing the two sides of the positive-electrode collector with a roll to compression-mold the positive-electrode collector. The positive electrode had a width of 39.5 mm. The positive electrode had a portion wherein both collector surfaces had the positive-electrode-mix layer formed. This portion having a length of 167 mm. The positive electrode also had an 80 mm portion in which the positive-electrode-mix layer was formed on one surface. The thickness of each of the positive-electrode-mix layers was 80 μm. The positive electrode had the outermost end and the innermost end, each incorporating a portion in which the positive-electrode-mix layer was not formed and in which only the positive-electrode collector was formed.

The elongated positive electrode, the negative electrode, and the two separators, each of which had a thickness of about 25 μm and a width of 44 mm and which were in the form of small-pore polypropylene films, were laminated. The laminate had four layers formed by sequentially laminating the negative electrode, the separator, the positive electrode and the separator in this sequential order. The laminate was lengthwise wound a plurality of times. Thus, a spiral shape was formed which had a structure such that the portion in which one side of the positive-electrode collector had the positive-electrode-mix layer was first wound and the negative electrode was placed inside. The end of the outermost separator was secured with a tape. The negative electrode of the coil electrode was longer than the positive electrode. Therefore, in the direction from the inner portion of the coil electrode toward the outer portion, the outermost end of the negative electrode collector (which was the outermost end of the negative electrode) was positioned more forward than the outermost end of the positive electrode collector (which was the outermost end of the positive electrode).

The outer diameter of the coil collector was 13 mm, while the inner diameter of a hollow portion formed in the central portion of the coil collector was 3.5 mm. The outermost end of the negative-electrode collector (which was the outermost end of the negative electrode) and the outermost end of the positive-electrode collector (which was the outermost end of the positive electrode) were positioned apart from each other at a distance L, which was 35 mm.

In this embodiment, the negative-electrode lead was positioned at the outermost end of the negative electrode, while the positive-electrode lead was positioned at the innermost end of the positive electrode.

The coil electrode was accommodated in an iron battery can applied with nickel plating. An insulating plate was placed on each of the upper and lower sides of the coil electrode. The positive-electrode lead was connected to the battery cover by welding, while the negative-electrode lead was connected to the battery can by welding.

A nonaqueous electrolyte was prepared by dissolving, at a concentration of 1 mole/litter, $LiPF_6$ in a mixed solvent which contained propylene carbonate and diethyl carbonate in the same quantities. About 3.0 g of the nonaqueous electrolyte was injected into the battery can so as to be impregnated into the coil electrode. The battery can was crimped through an insulating sealing gasket applied with asphalt so that the battery cover was secured. Thus, the hermeticity in the battery was maintained. The foregoing cylindrical nonaqueous-electrolyte secondary battery having a diameter of 14 mm and a height of 50 mm was called Sample 1 for convenience.

Samples 2, 3, 4 to 6, 11 and 12

Cylindrical nonaqueous-electrolyte secondary batteries were manufactured by a method similar to that for manufacturing Sample 1 except that the distance from the outermost end of the negative electrode to the outermost end of the positive electrode was varied as shown in Table 1. As shown in Table 1, for Sample 2, the distance from the outermost end of the negative electrode and the outermost end of the positive electrode was −2 mm. For Sample 3, the positive-electrode collector overlapped the negative-electrode collector in the outermost portion so that the distance from the outermost end of the negative electrode to the outermost end of the positive electrode was 0 mm and the end of the negative-electrode collector and the end of the positive-electrode collector coincided with each other in the outermost portion. Samples 4 to 6, 11, 12, 2 and 3 were structured such that the outer diameter of the coil electrode was made to be 13 mm by adjusting the lengths of the positive-electrode-mix layers formed on the two sides of the positive electrode and the lengths of the negative-electrode-mix layers formed on the two sides of the negative electrode.

| | Length of Positive-Electrode-Mix Layer Formed on Either Side of Positive Electrode at Innermost End of Positive Electrode (mm) | Length of Positive-Electrode-Mix Layer Formed on Either Side of Positive Electrode at Outermost End of Positive Electrode (mm) | Length of Positive-Electrode-Mix Layers Formed on Two Sides of Positive Electrode (mm) | Length of Negative-Electrode-Mix Layers Formed on Two Sides of Negative Electrode (mm) |
|---|---|---|---|---|
| Sample 1 | 80 | 0 | 167 | 250 |
| Sample 2 | 80 | 0 | 167 | 250 |
| Sample 3 | 80 | 0 | 167 | 250 |
| Sample 4 | 60 | 0 | 182 | 245 |
| Sample 5 | 40 | 0 | 197 | 240 |
| Sample 6 | 20 | 0 | 201 | 224 |
| Sample 7 | 0 | 5 | 205 | 213 |
| Sample 8 | 0 | 15 | 202 | 220 |
| Sample 9 | 0 | 50 | 176 | 229 |
| Sample 10 | 40 | 10 | 194 | 247 |
| Sample 11 | 60 | 0 | 179 | 243 |
| Sample 12 | 60 | 0 | 177 | 241 |
| Sample 13 | 60 | 0 | 176 | 239 |
| Sample 14 | 395 | — | 0 | 0 |
| Sample 15 | 395 | — | 0 | 0 |

| | Length of Negative-Electrode-Mix Layers Formed on Either Side of Negative Electrode (mm) | Distance from Outermost End of Negative Electrode to Outermost End of Positive Electrode (mm) | Energy Density Ratio | Percent Defective (%) |
|---|---|---|---|---|
| Sample 1 | 0 | 35 | 100.0 | 3 |
| Sample 2 | 0 | −2 | 100.0 | 20 |
| Sample 3 | 0 | 0 | 100.0 | 18 |
| Sample 4 | 0 | 15 | 102.4 | 3 |
| Sample 5 | 0 | 10 | 104.8 | 1 |
| Sample 6 | 0 | 17 | 101.9 | 1 |
| Sample 7 | 0 | 33 | 100.2 | 2 |
| Sample 8 | 0 | 35 | 101.2 | 2 |
| Sample 9 | 0 | 50 | 97.1 | 1 |
| Sample 10 | 0 | 5 | 105.8 | 6 |
| Sample 11 | 0 | 27 | 101.0 | 1 |
| Sample 12 | 0 | 38 | 100.0 | 2 |

-continued

| | | | | |
|---|---|---|---|---|
| Sample 13 | 0 | 43 | 99.5 | 3 |
| Sample 14 | 398 | 35 | 95.0 | 2 |
| Sample 15 | 398 | 0 | 95.0 | 20 |

Samples 7 to 9

Processes similar to that for manufacturing Sample 1 were performed except that the positive-electrode-mix layer was formed on one side of the positive electrode collector at the position adjacent to the innermost end of the positive electrode. Moreover, the distance from the outermost end of the negative electrode to the outermost end of the positive electrode was varied as shown in Table 1. The thus-manufactured cylindrical nonaqueous-electrolyte secondary batteries were called Samples 7 to 9 for convenience. Samples 7 to 9 were structured so that the outer diameter of the coil electrode was made to be 13 mm by adjusting the lengths of the positive-electrode-mix layers formed on the two sides of the positive electrode and the lengths of the negative-electrode-mix layers formed on the two sides of the negative electrode.

Sample 10

A cylindrical nonaqueous-electrolyte secondary battery was manufactured by a method similar to that for manufacturing Sample 1 except that the positive-electrode-mix layer was formed on one side of the positive electrode collector at the positions adjacent to the innermost and outermost ends of the positive electrode. Moreover, the distance from the outermost end of the negative electrode to the outermost end of the positive electrode was varied as shown in Table 1. The thus-manufactured cylindrical nonaqueous-electrolyte secondary battery was called Sample 10 for convenience. Sample 10 was structured such that the outer diameter of the coil electrode was made to be 13 mm by adjusting the lengths of the positive-electrode-mix layers formed on the two sides of the positive electrode.

Sample 14 and 15

Cylindrical nonaqueous-electrolyte secondary batteries were manufactured by a method similar to that for manufacturing Sample 1 except that the positive-electrode-mix layer was formed on the overall length of only either side of the positive electrode and the negative electrode. Moreover, the distance from the outermost end of the negative electrode to the outermost end of the positive electrode was varied as shown in Table 1. The thus-manufactured cylindrical nonaqueous-electrolyte secondary batteries were called Samples 14 and 15 for convenience. Sample 14 and 15 were structured such that the outer diameter of the coil electrode was made to be 13 mm by adjusting the lengths of the positive-electrode-mix layer formed on one side of the positive electrode.

Evaluation of Samples

Each of samples 1 to 15 was charged for 8 hours at a charging voltage of 4.20 V with a charging current of 300 mA. The foregoing samples were, with a load of 600 mA, discharged to 2.75 V. The energy densities were then measured. Assuming that the result of Sample 3 was 100, the energy densities of the sample batteries with respect to 100 were obtained. A percentage defective of each battery was obtained. The results are shown in Table 1.

Comparisons were performed among Samples 2, 3 and 15 and samples 1, 4 to 14. Samples 2, 3 and 15 were structured such that the distance from the outermost end of the negative electrode to the outermost end of the positive electrode was −2 mm. Therefore, the positive-electrode collector overlapped the negative-electrode collector in the outermost portion. As an alternative to this, the distance from the outermost end of the negative electrode to the outermost end of the positive electrode was 0 mm. Therefore, the end of the negative-electrode collector and the end of the positive-electrode collector coincided with each other in the outermost portion. Samples 1, 4 to 14 were manufactured such that the outermost end of the negative-electrode collector (which was the outermost end of the negative electrode) was, in a direction from the inner portion of the coil electrode toward the outer portion of the same, positioned more forward than the outermost end of the positive-electrode collector (which was the outermost end of the positive electrode). A comparison of the Samples 1, 4 and 14 with 2, 3 and 15 shows that the percentage of defective batteries could be considerably reduced without reduction in the energy density.

Samples 1 and 4 to 14 were structured such that the outermost end of the negative-electrode collector (which was the outermost end of the negative electrode) was, in a direction from the inner portion of the coil electrode toward the outer portion of the same, positioned more forward than the outermost end of the positive-electrode collector (which was the outermost end of the positive electrode). Samples 1, 4 to 8 and 10 to 14 among the foregoing Samples 1 and 4 to 14 were structured such that the distance L from the outermost end of the negative-electrode collector (which was the outermost end of the negative electrode) to the outermost end of the positive-electrode collector (which was the outermost end of the positive electrode) satisfied the relationship $0 < L \leq \pi d$. Sample 9 did not satisfy the above-mentioned relationship. When the foregoing samples were compared with one another, Sample 9 encountered somewhat reduction in the energy density.

Samples 14 and 15, having the electrode mix layer formed on only either side of each of the collectors of both of the positive electrode and the negative electrode, were also tested. When the electrode mix layer was formed on only either side of the collector, Sample 14 had a reduced percentage of defective batteries without a reduction in the energy density. On the other hand, Sample 15 encountered a high percentage defective batteries.

As can be understood from the above-mentioned results, the present invention is exemplified by Samples 1 and 4 to 14. The secondary battery of the present invention has elongated positive and negative electrodes laminated through separators. The laminate is wound such that the positive electrode forms the outermost layer of the coil electrode. Moreover, the positive-electrode-mix layer is formed on either a first or second surface of the collector at a position adjacent to the outermost end of the positive electrode and/or a position adjacent to the innermost end. At the outermost end of the positive electrode, the positive-electrode-mix layer is not formed on the positive-electrode collector. That is, only the positive-electrode collector is formed. At the outermost end of the negative electrode, the negative-electrode-mix layer is not formed on the negative-electrode collector. That is, only the negative-electrode collector is formed. In the direction from the inner portion of the coil electrode toward the outer portion of the electrode, the outermost end of the negative-electrode collector (which is the outermost end of the negative electrode) is positioned more forward than the outermost end of the positive-electrode collector (which is the outermost end of the positive electrode). Thus, the non-reacted active material of the negative electrode in the battery can be reduced. The effective reactive area can be enlarged in the battery correspondingly. Therefore, more of the inside portion of the battery can effectively be used, causing the energy density to be raised.

In the present invention, the negative-electrode lead is formed adjacent to the outermost end of the negative-electrode collector (which is the outermost end of the negative electrode). In the direction from the inner portion of the coil electrode toward the outer portion of the same, the negative-electrode lead is positioned more forward than the outermost end of the positive-electrode collector (which is the outermost end of the positive electrode). Thus, even if the negative-electrode lead pierces the separator disposed between the coil electrode and the battery can, the negative-electrode lead is brought into contact with only the battery can which is the same negative electrode. In this state, an internal short circuit does not take place, and no defect occurs. Thus, the reliability of the battery can be improved.

In the present invention, the outermost end of the negative-electrode collector (which is the outermost end of the negative electrode) is positioned more forward than the outermost end of the positive-electrode collector (which is the outermost end of the positive electrode). Assuming that the distance from the outermost end of the negative-electrode collector to the outermost end of the positive-electrode collector is L and the diameter of the coil electrode is d, when the relationship $0<L \leq \pi d$ is satisfied. Thus, the energy density can be raised and the lifetime elongated.

In other tests, the diameter of the cylindrical nonaqueous-electrolyte secondary battery was varied to 18 mm and 20 mm to evaluate each of the manufactured cylindrical nonaqueous-electrolyte secondary batteries. Similar results to those just described were obtained.

In still another test, an elliptical coil electrode was manufactured as the coil electrode in a rectangular nonaqueous-electrolyte secondary battery having a thickness of 9 mm, a width of 34 mm and a height of 48 mm. The outermost end of the negative-electrode collector (which was the outermost end of the negative electrode) was positioned more forward than the outermost end of the positive-electrode collector (which was the outermost end of the positive electrode). The distance from the outermost end of the negative-electrode collector positioned at the outermost end of the negative electrode to the outermost end of the positive-electrode collector positioned at the outermost end of the positive electrode was no longer than the circumference of the coil electrode. This also reduced the percentage of defective batteries without reducing the energy density.

As described above, the nonaqueous-electrolyte secondary battery according to the present invention comprises a coil electrode formed by laminating an elongated positive electrode and an elongated negative electrode through a separator. The laminate is wound such that the positive electrode is positioned at the outermost position of the coil. The positive-electrode-mix layer is formed on either the first or second surface of the collector at the position adjacent to the outermost end of the positive electrode and/or the position adjacent to the innermost end. The positive-electrode-mix layer is not formed on the positive-electrode collector at the outermost end of the positive electrode so that only the positive-electrode collector exists at the outermost end. The negative-electrode-mix layer is not formed on the negative-electrode collector at the outermost end of the negative electrode so that only the negative-electrode collector exists at the outermost end. The outermost end of the negative-electrode collector positioned at the outermost end of the negative electrode is, in the direction from the inner portion of the coil electrode toward the outer portion of the coil, positioned more forward than the outermost end of the positive-electrode collector. Therefore, the quantity of the non-reacted active material for the negative electrode in the battery is reduced. The effective battery area is thus enlarged. Because the inside portion of the battery can be more effectively used, the energy density is raised and the lifetime is elongated.

The nonaqueous-electrolyte secondary battery according to the present invention incorporates a negative-electrode lead formed adjacent to the outermost end of the negative-electrode collector positioned at the outermost end of the negative electrode. The negative-electrode collector is, in the direction from the inner portion of the coil electrode toward the outer portion of the coil, positioned more forward than the outermost end of the positive-electrode collector. Thus, even if the negative-electrode lead pierces the separator disposed between the coil electrode and the battery can, the negative-electrode lead is brought into contact with only the battery can, which is also the negative electrode. Therefore, an internal short circuit can be prevented and the reliability of the battery can be improved.

The coil electrode of the nonaqueous-electrolyte secondary battery according to the present invention is structured such that the distance L from the outermost end of the negative-electrode collector positioned at the outermost end of the negative electrode to the outermost end of the positive-electrode collector positioned at the outermost end of the positive electrode satisfies $0<L \leq \pi d$ when the diameter of the coil electrode is d. With these parameters, an internal short circuit can be prevented, the energy density can be further raised and the lifetime elongated.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A nonaqueous-electrolyte secondary battery comprising:
   a battery casing; and
   a coiled electrode contained in said battery casing;
   wherein said coiled electrode comprises an elongated positive electrode, an elongated negative electrode, and a separator, said positive electrode and negative electrode separated by the separator and wound so that the positive
   wherein said positive electrode comprises a positive-electrode mix layer and a positive-electrode collector made of a metallic foil having a first surface, a second surface, an outermost end, and an innermost end;
   wherein said positive-electrode mix layer is not formed on either the first or second surface of the positive electrode collector at the outermost end of the positive electrode collector;
   wherein said positive-electrode mix layer is formed on either but not both of the first or second surfaces of the positive electrode collector at a position adjacent to the outermost end of the positive electrode collector;

wherein said positive-electrode mix layer is formed on both the first and second surface of the positive electrode collector on at least a portion of the positive electrode collector;

wherein said negative electrode comprises a negative-electrode mix layer containing a negative-electrode material which permits lithium ions to be doped/dedoped and a negative-electrode collector made of a metallic foil having a first surface, a second surface, an outermost end, and an innermost end;

wherein said negative-electrode mix layer is not formed on either the first or second surface of the negative electrode collector at the outermost end of the negative electrode collector;

wherein said negative-electrode mix layer material is formed on both the first and second surface of the negative electrode collector on at least a portion of the negative electrode collector;

wherein a negative electrode lead is formed on the outermost end of the outer surface of the negative electrode collector;

wherein the outermost end of said negative-electrode collector is positioned, in the direction of the innermost ends to the outermost ends of the negative-electrode and positive electrode collectors, more forward than the outermost wherein d is the diameter of the coil electrode and L is the distance from the outermost end of said negative-electrode collector t3 the outermost end of said positive-electrode collector and the relationship $0 < L \leq \pi d$ is satisfied; and wherein insulating members are placed on the two vertical surfaces of the coiled electrode.

2. A nonaqueous-electrolyte secondary battery according to claim 1 wherein said negative-electrode mix contains a negative-electrode material and a binder.

3. A nonaqueous-electrolyte secondary battery according to claim 2 wherein said negative-electrode material is at least one material selected from a group consisting of a crystalline metal oxide and an amorphous metal oxide which permit doping and dedoping of lithium ions.

4. A nonaqueous-electrolyte secondary battery according to claim 1 wherein said positive-electrode mix contains a positive-electrode material, a conductive material and a binder.

5. A nonaqueous-electrolyte secondary battery according to claim 4 wherein said positive-electrode material is at least one material selected from a group consisting of $LiMO_2$, where M is at least any one of Co, Ni, Mn, Fe, Al, V and Ti, and interlayer compounds each containing Li.

6. A nonaqueous-electrolyte secondary battery according to claim 1 wherein said separator is made of at least one material selected from a group consisting of polyethylene and polypropylene.

7. A nonaqueous-electrolyte secondary battery according to claim 1 wherein said positive-electrode collector is made of at least one material selected from a group consisting of aluminum, stainless steel and nickel.

8. A nonaqueous-electrolyte secondary battery according to claim 1 wherein said negative-electrode collector is made of at least one material selected from a group consisting of copper, stainless steel and nickel.

9. A nonaqueous-electrolyte secondary battery according to claim 1 wherein said nonaqueous-electrolyte secondary battery contains a nonaqueous electrolyte prepared by dissolving an electrolyte in nonaqueous solvent, and said nonaqueous solvent is made of at least one material selected from a group consisting of propylene carbonate, ethylene carbonate, 1,2-dimethoxyethane, 1,2-diethoxyethane, diethylcarbonate, γ-butyrolactone, tetrahydrofuran, 1,3-dioxolane, 4-methyl-1,3-dioxolane, diethylether, sulfolane, methylsulfolane, acetonitrile and propionitrile.

10. A nonaqueous-electrolyte secondary battery according to claim wherein said electrolyte is at least one material selected from a group consisting of $LiClO_4$, $LiAsF_6$, $LiPF_6$, $LiBF_4$, $LiB(C_6H_5)_4$, LiCl, LiBr, $LiSO_3CH_3$ and $LiSO_3CF_3$.

11. A non-aqueous electrolyte secondary battery according to claim 1 wherein said positive-electrode mix layer is formed on either the first or second surface of the positive electrode collector at a position adjacent to the innermost end of said positive electrode collector.

* * * * *

UNITED STATES PATENT AND TRADEMARK OFFICE
CERTIFICATE OF CORRECTION

| | | |
|---|---|---|
| PATENT NO. | : 6,869,723 B2 | |
| APPLICATION NO. | : 09/262325 | |
| DATED | : March 22, 2005 | |
| INVENTOR(S) | : Akira Yamaguchi | |

It is certified that error appears in the above-identified patent and that said Letters Patent is hereby corrected as shown below:

Column 15, line 30

"forward than the outermost"

should be

--forward than the outermost end of the positive electrode collector.--

Column 15, line 33

"collector t3 the outermost end of said positive-electrode"

should be

--collector to the outermost end of said positive-electrode--

Column 16, line 35

"to claim wherein said electrolyte is at least one material"

should be

--to claim 9 wherein said electrolyte is at least one material--

Signed and Sealed this
Twenty-eighth Day of February, 2012

David J. Kappos
*Director of the United States Patent and Trademark Office*